Figure 1:
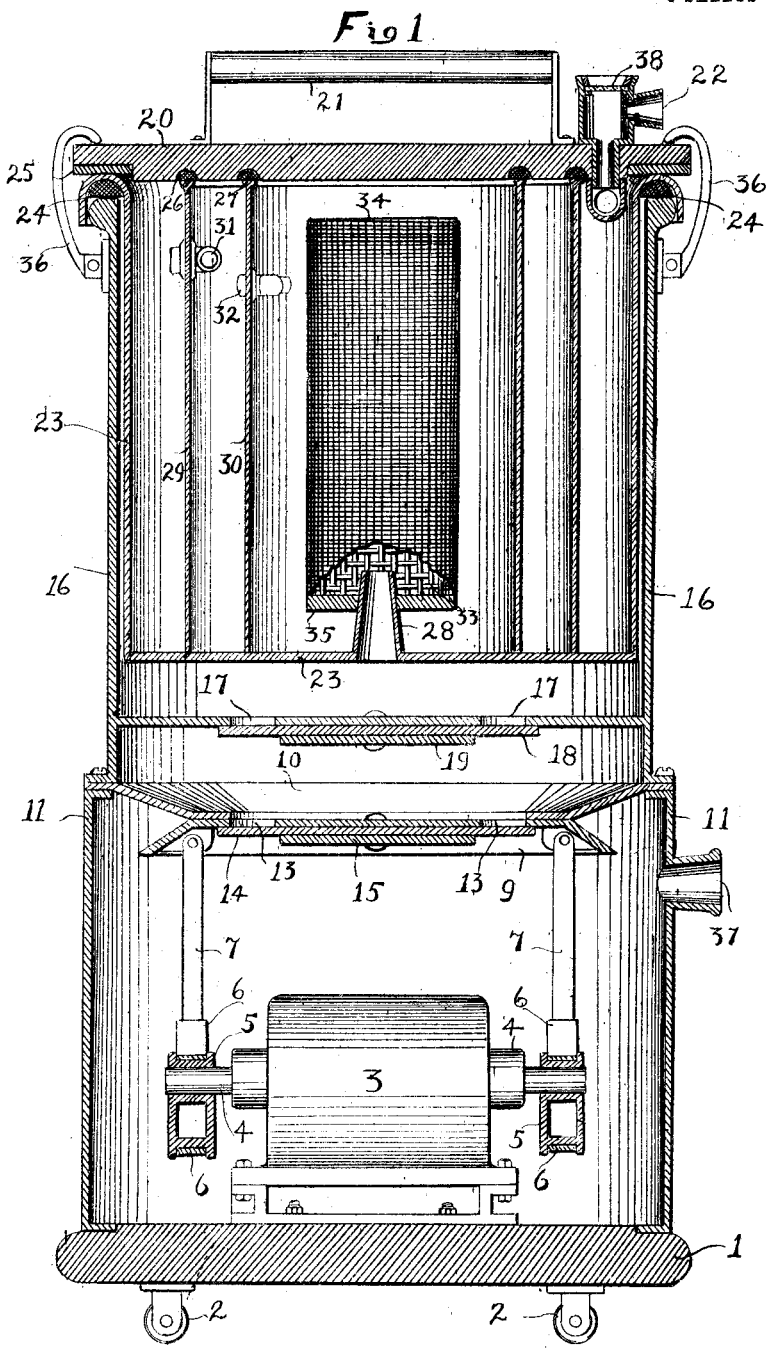

F. S. R. PRENTISS.
DUST COLLECTOR FOR VACUUM CLEANERS.
APPLICATION FILED JUNE 2, 1911.

1,029,562.

Patented June 11, 1912.

3 SHEETS—SHEET 1.

WITNESSES
H. B. Clark
B. M. Freund

INVENTOR
F. S. R. Prentiss
BY
Carlos P. Griffin
ATTORNEY

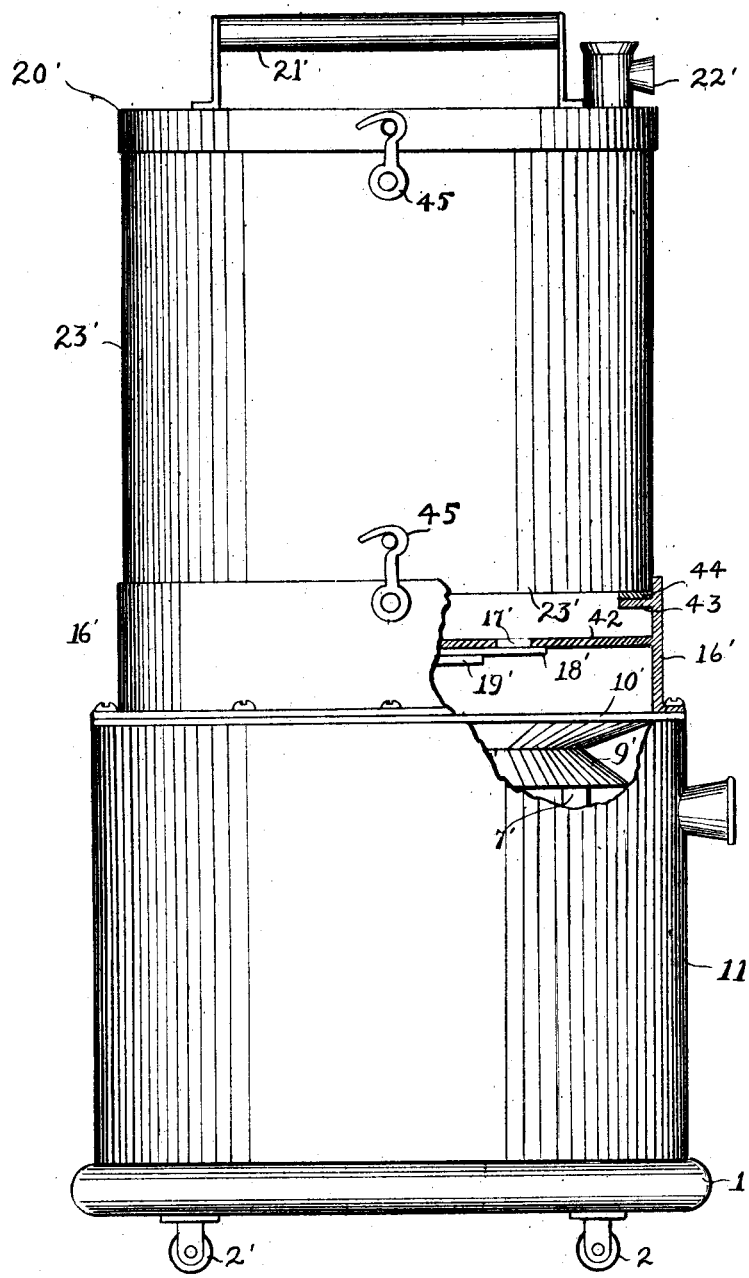

F. S. R. PRENTISS.
DUST COLLECTOR FOR VACUUM CLEANERS.
APPLICATION FILED JUNE 2, 1911.
1,029,562.
Patented June 11, 1912.
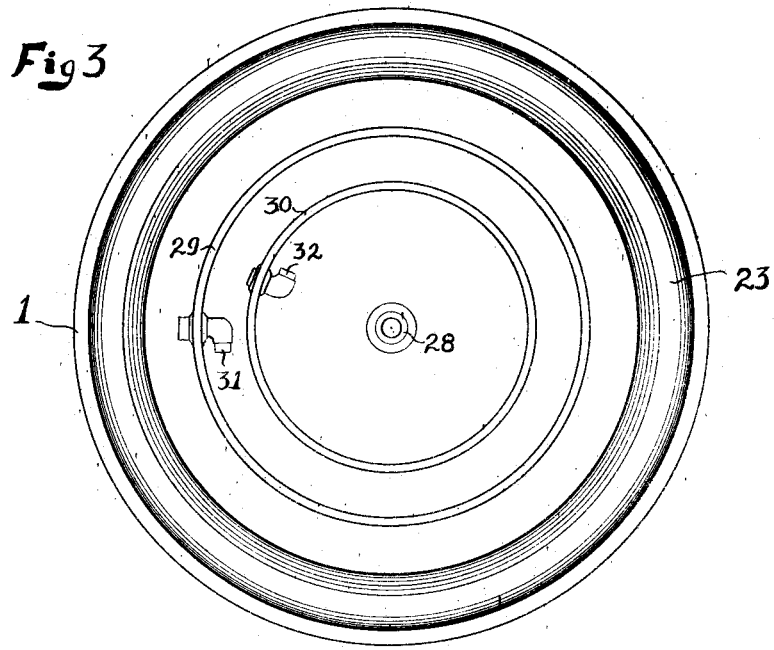
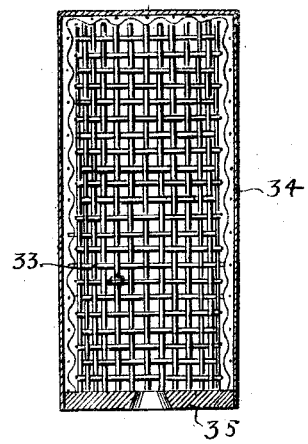
WITNESSES
H.B. Clark
B.M. Freud
INVENTOR
F.S.R. Prentiss
BY
Los P. Griffin
ATTORNEY

UNITED STATES PATENT OFFICE.

FRANK S. R. PRENTISS, OF SAN FRANCISCO, CALIFORNIA.

DUST-COLLECTOR FOR VACUUM-CLEANERS.

1,029,562. Specification of Letters Patent. Patented June 11, 1912.

Application filed June 2, 1911. Serial No. 630,866.

*To all whom it may concern:*

Be it known that I, FRANK S. R. PRENTISS, citizen of the United States, residing at San Francisco, in the county of San Francisco and State of California, have invented a new and useful Dust-Collector for Vacuum-Cleaners, of which the following is a specification in such full and clear terms as will enable those skilled in the art to construct and use the same.

This invention relates to a vacuum cleaner, and its object is to provide means for the collection of dust gathered by such a cleaner.

An object of the invention is to provide means for the collection of the dust in such a manner as to make possible the cleaning of the dust collecting chamber with as little disagreeable labor as possible.

A further object of the invention is to provide a dust filter which will be so arranged as to avoid the collection thereon of as much of the dust as can possibly be settled before the air passes through the filter, thus increasing the amount of dust that may be collected at any given time, without decreasing the effectiveness of the vacuum cleaner.

Another object of the invention is to provide an air filter which may be readily removed from the machine and cleaned, or which may have another filter substituted therefor as desired, the receptacle for the dust being removable from the machine to be emptied.

Other objects of the invention will appear as the description proceeds.

In the drawings in which the same numeral of reference is applied to the same portion throughout the several views, Figure 1 is a sectional view of a positive suction bellows apparatus illustrating the filter applied thereto, Fig. 2 shows the filter when used in connection with a machine having the casing over the lower portion of the suction apparatus only, the air filter being removable from the top of the casing over the motor and pump, Fig. 3 shows a plan view of the dust collecting pan with the cover and air filter removed therefrom, and Fig. 4 is a sectional view through the air filter showing the two layers of foraminous material carried thereby.

The numeral 1 represents the base of the machine, which may be of any suitable material and which is provided with caster wheels 2. This base supports a motor 3, said motor having a shaft 4, on each end of which is an eccentric 5. Each eccentric has a strap 6. therearound, which strap is connected to the link 7, and said link is connected at its upper end to a disk member 9. This disk member has its edges beveled as shown and is secured to a diaphragm 10, the latter being connected at its periphery to the casings 11 and 16. The disk is provided with a plurality of holes 13 around its edges, and it has a leather disk 14 secured to its under side, said disk 14 being large enough to cover all of the holes and being held in place against the under side of said disk by means of a plate 15, said plate being about the diameter of that portion of the disk between the holes 13.

The upper portion of the machine is formed with a casing 16 and said casing has holes 17 in the bottom thereof, which holes are closed by means of a leather disk 18 substantially like the one on the under side of the movable disk, a plate 19 holding said leather disk in place. The two plates holding the leather disk in place are secured in their respective positions by means of a suitable bolt at the center thereof, as shown.

The cover 20 has a handle 21 and has an inlet pipe 22, said inlet pipe having an elbow within the dust-collecting compartment, which is so turned as to cause the incoming current of air to travel around the dust-collecting pan 23. The dust-collecting pan 23 is removable from the machine, and is provided with a gasket 24 to make a tight joint with the upper edge of the casing. The cover 20 is provided with three gaskets 25, 26 and 27 to make tight joints with the edges of the dust collecting compartments of the pan 23. The pan 23 has an inverted funnel shaped outlet 28 at the bottom thereof, and it is provided with two concentric inner rings 29 and 30, communication being had from the outer compartment thus formed through elbows 31 and 32.

The filter comprises a wire cage 33 covered with cloth 34, which is secured to a base plate 35, the latter resting upon the nipple 28 and forming an air tight joint therewith, whereby any dust failing to accumulate in the outer spaces between the outside pan 33 and the inner pans 29 and 30, will be prevented from passing through the suction apparatus.

The cover 20 is held in place on the top of the pan 23, and the pan 23 is held to the casing 16 by means of suitable hooks 36. Since it is sometimes desirable to use this form of apparatus as a blowing machine rather than a suction machine, the lower casing 11 is provided with a flaring outlet pipe 37, with which the suction hose, or in this case the blowing hose, may be connected.

In order to determine the amount of dust carried by the air passing through the machine, a window 38 is provided in the top of the inlet fixture 22.

It will be noted in Fig. 3 that the two elbows in the inner pans 29 and 30 face in reverse directions, the object being to retard the velocity of the air as much as possible, when the same is passing through the machine, thus tending to precipitate all of the dust before it reaches the filter 34. An advantage of this type of machine lies in the fact that the air filter requires practically no cleaning, nearly all of the dust collecting in the outer compartments of the dust collecting pan, but should the filter become too foul to continue in use, all that is necessary is to lift the same out and place a new filter in position, the old filter being cleaned in any suitable manner at leisure.

In Fig. 2 there is shown a slightly modified form of the invention, in that the casing forming the upper part of the machine is cut down so that the outside of the pan 23 serves in the place thereof. Otherwise in this form of the invention the apparatus is substantially the same as in the preceding form. In this the base 1′ is provided with wheels 2′ above which extends a casing 11′ substantially the same as the casing used with the other machine. Within this is a disk 9′, operating link 7′, and leather annulus 10′, the operation being substantially the same as in the other form of the invention shown. Above the casing 11′ there is a casing 16′ which extends above the casing 11 only high enough to afford suitable clearance for the disk 9′, disks 18′ and 19′ being secured to the diphragm 42 which extends across the casing 16′. The casing 16′ is also provided with a flange 43 on which is seated a gasket 44, and hooks 45 hold the pan 23′ in close contact with the casing 16′.

The cover 20′ of the machine is substantially identical with the cover shown in the other form of the invention, and it has an inlet pipe 22′ and handle 21′ for moving the machine from place to place. An advantage of this form of the invention lies in the fact that all of the metal forming the casing above the top of the pan 23 is dispensed with, thus reducing the weight of the machine very considerably, a great desideratum in machines to be handled by women.

Having thus described my invention what I claim as new and desire to secure by Letters Patent of the United States is as follows:

1. In a dust collector for vacuum cleaners, a pan having a plurality of compartments therein and open at the top, a cover for said pan, means to make same substantially air tight, and a joint at the top wall of each of said compartments, an air inlet pipe in said cover and adjacent the outer wall of said pan, said pan having openings from one compartment to another; an outlet pipe in the central compartment and a dust filter secured on said outlet pipe, substantially as described.

2. In a dust collector for vacuum cleaners, a pan having a plurality of compartments therein, said pan having openings from one compartment to another, means whereby the air passing from one compartment to another will be directed around the several compartments, a cover having means to make a substantially air tight joint with each of said compartments, an air inlet pipe through said cover and adjacent the outer wall of said pan, an air outlet pipe in the inner compartment and a dust filter supported upon said air outlet pipe, substantially as described.

In testimony whereof I have hereunto set my hand this 11th day of May A. D. 1911, in the presence of the two subscribed witnesses.

FRANK S. R. PRENTISS.

Witnesses:
C. P. GRIFFIN,
L. C. PRENTISS.